US009305599B2

(12) United States Patent
Smyth et al.

(10) Patent No.: US 9,305,599 B2
(45) Date of Patent: Apr. 5, 2016

(54) STORAGE DEVICE WITH A COVER SUPPORTING PORTION

(71) Applicant: Western Digital Technologies, Inc., Irvine, CA (US)

(72) Inventors: Nicholas D. Smyth, San Jose, CA (US); Daniel T. Nguyen, Milpitas, CA (US); David K. Myers, Campbell, CA (US)

(73) Assignee: Western Digital Technologies, Inc., Irvine, CA (US)

( * ) Notice: Subject to any disclaimer, the term of this patent is extended or adjusted under 35 U.S.C. 154(b) by 0 days.

(21) Appl. No.: 14/798,779

(22) Filed: Jul. 14, 2015

(65) Prior Publication Data

US 2015/0318016 A1   Nov. 5, 2015

Related U.S. Application Data

(62) Division of application No. 13/897,655, filed on May 20, 2013, now Pat. No. 9,099,153.

(60) Provisional application No. 61/808,156, filed on Apr. 3, 2013.

(51) Int. Cl.
*G11B 21/22* (2006.01)
*G11B 25/04* (2006.01)
*G11B 5/012* (2006.01)

(52) U.S. Cl.
CPC .............. *G11B 25/043* (2013.01); *G11B 5/012* (2013.01); *G11B 21/22* (2013.01)

(58) Field of Classification Search
CPC ......... G11B 21/22; G11B 25/043; G11B 5/54

USPC ................................ 360/97.11, 264.3, 256.2
See application file for complete search history.

(56) References Cited

U.S. PATENT DOCUMENTS

| | | |
|---|---|---|
| 4,562,500 A | 12/1985 | Bygdnes |
| 5,235,482 A | 8/1993 | Schmitz |
| 5,402,290 A | 3/1995 | Daniel |
| 5,455,728 A | 10/1995 | Edwards et al. |
| 5,640,290 A | 6/1997 | Khanna et al. |
| 5,703,735 A | 12/1997 | Bleeke |
| 5,734,527 A * | 3/1998 | Reinhart .................... 360/256.2 |
| 5,757,587 A | 5/1998 | Berg et al. |
| 5,815,350 A | 9/1998 | Kennedy et al. |
| 5,822,155 A | 10/1998 | Oveyssi et al. |
| 5,982,587 A | 11/1999 | Alagheband et al. |
| 6,046,889 A | 4/2000 | Berding et al. |
| 6,052,890 A | 4/2000 | Malagrino, Jr. et al. |

(Continued)

OTHER PUBLICATIONS

Notice of Allowance dated Mar. 30, 2015 from U.S. Appl. No. 13/897,655, 8 pages.

(Continued)

*Primary Examiner* — Angel Castro

(57) ABSTRACT

A disk drive assembly having a base; a voice coil motor assembly (VCM) comprising a VCM cover; a post extending from the base toward the VCM cover; and a latch movable mounted on the post such that the post extends there through, wherein the post comprises a cover supporting portion configured to support the VCM cover, and prevent the VCM cover from compressing the latch and causing the latch to contact both the VCM cover and the base simultaneously when a load is applied to a portion of the VCM cover above the latch.

18 Claims, 7 Drawing Sheets

(56) References Cited

U.S. PATENT DOCUMENTS

| | | | |
|---|---|---|---|
| 6,061,206 A | 5/2000 | Foisy et al. | |
| 6,101,876 A | 8/2000 | Brooks et al. | |
| 6,147,831 A | 11/2000 | Kennedy et al. | |
| 6,151,189 A | 11/2000 | Brooks | |
| 6,151,197 A | 11/2000 | Larson et al. | |
| 6,185,067 B1 | 2/2001 | Chamberlain | |
| 6,185,074 B1 | 2/2001 | Wang et al. | |
| 6,208,486 B1 | 3/2001 | Gustafson et al. | |
| 6,215,616 B1 | 4/2001 | Phan et al. | |
| 6,271,987 B1 | 8/2001 | Allsup et al. | |
| 6,272,694 B1 | 8/2001 | Knoth | |
| 6,288,866 B1 | 9/2001 | Butler et al. | |
| 6,292,333 B1 | 9/2001 | Blumentritt et al. | |
| 6,344,950 B1 | 2/2002 | Watson et al. | |
| 6,349,464 B1 | 2/2002 | Codilian et al. | |
| 6,351,344 B1 | 2/2002 | Krum et al. | |
| 6,351,350 B1 | 2/2002 | Symons et al. | |
| 6,381,103 B1 * | 4/2002 | Misso et al. | 360/256.2 |
| 6,388,873 B1 | 5/2002 | Brooks et al. | |
| 6,417,979 B1 | 7/2002 | Patton, III et al. | |
| 6,421,208 B1 | 7/2002 | Oveyssi | |
| 6,441,998 B1 | 8/2002 | Abrahamson | |
| 6,462,914 B1 | 10/2002 | Oveyssi et al. | |
| 6,466,398 B1 | 10/2002 | Butler et al. | |
| 6,469,871 B1 | 10/2002 | Wang | |
| 6,502,300 B1 | 1/2003 | Casey et al. | |
| 6,519,116 B1 | 2/2003 | Lin et al. | |
| 6,529,345 B1 | 3/2003 | Butler et al. | |
| 6,529,351 B1 | 3/2003 | Oveyssi et al. | |
| 6,535,357 B1 * | 3/2003 | Misso et al. | 360/256.2 |
| 6,535,358 B1 | 3/2003 | Hauert et al. | |
| 6,545,382 B1 | 4/2003 | Bennett | |
| 6,549,381 B1 | 4/2003 | Watson | |
| 6,560,065 B1 | 5/2003 | Yang et al. | |
| 6,571,460 B1 | 6/2003 | Casey et al. | |
| 6,574,073 B1 | 6/2003 | Hauert et al. | |
| 6,580,574 B1 | 6/2003 | Codilian | |
| 6,594,111 B1 | 7/2003 | Oveyssi et al. | |
| 6,603,620 B1 | 8/2003 | Berding | |
| 6,618,222 B1 | 9/2003 | Watkins et al. | |
| 6,624,966 B1 | 9/2003 | Ou-Yang et al. | |
| 6,624,980 B1 | 9/2003 | Watson et al. | |
| 6,624,983 B1 | 9/2003 | Berding | |
| 6,628,473 B1 | 9/2003 | Codilian et al. | |
| 6,654,200 B1 | 11/2003 | Alexander et al. | |
| 6,657,811 B1 | 12/2003 | Codilian | |
| 6,661,597 B1 | 12/2003 | Codilian et al. | |
| 6,661,603 B1 | 12/2003 | Watkins et al. | |
| 6,674,600 B1 | 1/2004 | Codilian et al. | |
| 6,690,637 B1 | 2/2004 | Codilian | |
| 6,693,767 B1 | 2/2004 | Butler | |
| 6,693,773 B1 | 2/2004 | Sassine | |
| 6,697,217 B1 | 2/2004 | Codilian | |
| 6,698,286 B1 | 3/2004 | Little et al. | |
| 6,700,736 B1 | 3/2004 | Wu et al. | |
| 6,704,167 B1 | 3/2004 | Scura et al. | |
| 6,707,637 B1 | 3/2004 | Codilian et al. | |
| 6,707,641 B1 | 3/2004 | Oveyssi et al. | |
| 6,710,980 B1 | 3/2004 | Hauert et al. | |
| 6,710,981 B1 | 3/2004 | Oveyssi et al. | |
| 6,728,062 B1 | 4/2004 | Ou-Yang et al. | |
| 6,728,063 B1 | 4/2004 | Gustafson et al. | |
| 6,731,470 B1 | 5/2004 | Oveyssi | |
| 6,735,033 B1 | 5/2004 | Codilian et al. | |
| 6,741,428 B1 | 5/2004 | Oveyssi | |
| 6,744,604 B2 | 6/2004 | Misso | |
| 6,751,051 B1 | 6/2004 | Garbarino | |
| 6,754,042 B1 | 6/2004 | Chiou et al. | |
| 6,757,132 B1 | 6/2004 | Watson et al. | |
| 6,759,784 B1 | 7/2004 | Gustafson et al. | |
| 6,781,780 B1 | 8/2004 | Codilian | |
| 6,781,787 B1 | 8/2004 | Codilian et al. | |
| 6,781,791 B1 | 8/2004 | Griffin et al. | |
| 6,790,066 B1 | 9/2004 | Klein | |
| 6,791,791 B1 | 9/2004 | Alfred et al. | |
| 6,791,801 B1 | 9/2004 | Oveyssi | |
| 6,795,262 B1 | 9/2004 | Codilian et al. | |
| 6,798,603 B1 | 9/2004 | Singh et al. | |
| 6,801,389 B1 | 10/2004 | Berding et al. | |
| 6,801,403 B2 * | 10/2004 | Miyajima | 360/256.4 |
| 6,801,404 B1 | 10/2004 | Oveyssi | |
| 6,816,342 B1 | 11/2004 | Oveyssi | |
| 6,816,343 B1 | 11/2004 | Oveyssi | |
| 6,825,622 B1 | 11/2004 | Ryan et al. | |
| 6,826,009 B1 | 11/2004 | Scura et al. | |
| 6,831,810 B1 | 12/2004 | Butler et al. | |
| 6,839,199 B1 | 1/2005 | Alexander, Jr. et al. | |
| 6,844,996 B1 | 1/2005 | Berding et al. | |
| 6,847,504 B1 | 1/2005 | Bennett et al. | |
| 6,847,506 B1 | 1/2005 | Lin et al. | |
| 6,856,491 B1 | 2/2005 | Oveyssi | |
| 6,856,492 B2 | 2/2005 | Oveyssi | |
| 6,862,154 B1 | 3/2005 | Subrahmanyam et al. | |
| 6,862,156 B1 | 3/2005 | Lin et al. | |
| 6,862,176 B1 | 3/2005 | Codilian et al. | |
| 6,865,049 B1 | 3/2005 | Codilian et al. | |
| 6,865,055 B1 | 3/2005 | Ou-Yang et al. | |
| 6,867,946 B1 | 3/2005 | Berding et al. | |
| 6,867,950 B1 | 3/2005 | Lin | |
| 6,876,514 B1 | 4/2005 | Little | |
| 6,879,466 B1 | 4/2005 | Oveyssi et al. | |
| 6,888,697 B1 | 5/2005 | Oveyssi | |
| 6,888,698 B1 | 5/2005 | Berding et al. | |
| 6,891,696 B1 | 5/2005 | Ou-Yang et al. | |
| 6,898,052 B1 | 5/2005 | Oveyssi | |
| 6,900,961 B1 | 5/2005 | Butler | |
| 6,906,880 B1 | 6/2005 | Codilian | |
| 6,906,897 B1 | 6/2005 | Oveyssi | |
| 6,908,330 B2 | 6/2005 | Garrett et al. | |
| 6,917,491 B2 | 7/2005 | Choi | |
| 6,922,308 B1 | 7/2005 | Butler | |
| 6,930,848 B1 | 8/2005 | Codilian et al. | |
| 6,930,857 B1 | 8/2005 | Lin et al. | |
| 6,934,126 B1 | 8/2005 | Berding et al. | |
| 6,937,444 B1 | 8/2005 | Oveyssi | |
| 6,940,698 B2 | 9/2005 | Lin et al. | |
| 6,941,642 B1 | 9/2005 | Subrahmanyam et al. | |
| 6,947,251 B1 | 9/2005 | Oveyssi et al. | |
| 6,950,275 B1 | 9/2005 | Ali et al. | |
| 6,950,284 B1 | 9/2005 | Lin | |
| 6,952,318 B1 | 10/2005 | Ngo | |
| 6,954,329 B1 | 10/2005 | Ojeda et al. | |
| 6,958,884 B1 | 10/2005 | Ojeda et al. | |
| 6,958,890 B1 | 10/2005 | Lin et al. | |
| 6,961,212 B1 | 11/2005 | Gustafson et al. | |
| 6,961,218 B1 | 11/2005 | Lin et al. | |
| 6,963,469 B1 | 11/2005 | Gustafson et al. | |
| 6,965,500 B1 | 11/2005 | Hanna et al. | |
| 6,967,800 B1 | 11/2005 | Chen et al. | |
| 6,967,804 B1 | 11/2005 | Codilian | |
| 6,970,329 B1 | 11/2005 | Oveyssi et al. | |
| 6,972,924 B1 | 12/2005 | Chen et al. | |
| 6,972,926 B1 | 12/2005 | Codilian | |
| 6,975,476 B1 | 12/2005 | Berding | |
| 6,979,931 B1 | 12/2005 | Gustafson et al. | |
| 6,980,391 B1 | 12/2005 | Haro | |
| 6,980,401 B1 | 12/2005 | Narayanan et al. | |
| 6,982,853 B1 | 1/2006 | Oveyssi et al. | |
| 6,989,953 B1 | 1/2006 | Codilian | |
| 6,990,727 B1 | 1/2006 | Butler et al. | |
| 6,996,893 B1 | 2/2006 | Ostrander et al. | |
| 7,000,309 B1 | 2/2006 | Klassen et al. | |
| 7,006,324 B1 | 2/2006 | Oveyssi et al. | |
| 7,013,731 B1 | 3/2006 | Szeremeta et al. | |
| 7,031,104 B1 | 4/2006 | Butt et al. | |
| 7,035,053 B1 | 4/2006 | Oveyssi et al. | |
| 7,050,269 B2 | 5/2006 | Hong et al. | |
| 7,050,270 B1 | 5/2006 | Oveyssi et al. | |
| 7,057,852 B1 | 6/2006 | Butler et al. | |
| 7,062,837 B1 | 6/2006 | Butler | |
| 7,064,921 B1 | 6/2006 | Yang et al. | |
| 7,064,922 B1 | 6/2006 | Alfred et al. | |
| 7,064,932 B1 | 6/2006 | Lin et al. | |
| 7,085,098 B1 | 8/2006 | Yang et al. | |

(56) References Cited

U.S. PATENT DOCUMENTS

| | | | |
|---|---|---|---|
| 7,085,108 B1 | 8/2006 | Oveyssi et al. |
| 7,092,216 B1 | 8/2006 | Chang et al. |
| 7,092,251 B1 | 8/2006 | Henry |
| 7,099,099 B1 | 8/2006 | Codilian et al. |
| 7,113,371 B1 | 9/2006 | Hanna et al. |
| 7,136,246 B2 | 11/2006 | Khanna et al. |
| 7,142,397 B1 | 11/2006 | Venk |
| 7,145,753 B1 | 12/2006 | Chang et al. |
| RE39,478 E | 1/2007 | Hatch et al. |
| 7,161,768 B1 | 1/2007 | Oveyssi |
| 7,161,769 B1 | 1/2007 | Chang et al. |
| 7,180,711 B1 | 2/2007 | Chang et al. |
| 7,193,819 B1 | 3/2007 | Chen et al. |
| 7,209,317 B1 | 4/2007 | Berding et al. |
| 7,209,319 B1 | 4/2007 | Watkins et al. |
| D542,289 S | 5/2007 | Diebel |
| 7,212,377 B1 | 5/2007 | Ou-Yang et al. |
| 7,215,513 B1 | 5/2007 | Chang et al. |
| 7,215,514 B1 | 5/2007 | Yang et al. |
| 7,224,551 B1 | 5/2007 | Ou-Yang et al. |
| D543,981 S | 6/2007 | Diebel |
| 7,227,725 B1 | 6/2007 | Chang et al. |
| 7,239,475 B1 | 7/2007 | Lin et al. |
| 7,248,441 B2 * | 7/2007 | Chang et al. ............... 360/265.1 |
| 7,271,978 B1 | 9/2007 | Santini et al. |
| 7,274,534 B1 | 9/2007 | Choy et al. |
| 7,280,311 B1 | 10/2007 | Ou-Yang et al. |
| 7,280,317 B1 | 10/2007 | Little et al. |
| 7,280,319 B1 | 10/2007 | McNab |
| 7,292,406 B1 | 11/2007 | Huang |
| 7,298,584 B1 | 11/2007 | Yamada et al. |
| 7,327,537 B1 | 2/2008 | Oveyssi |
| 7,339,268 B1 | 3/2008 | Ho et al. |
| 7,342,746 B1 | 3/2008 | Lin |
| RE40,203 E | 4/2008 | Hatch et al. |
| 7,353,524 B1 | 4/2008 | Lin et al. |
| 7,369,368 B1 | 5/2008 | Mohajerani |
| 7,372,670 B1 | 5/2008 | Oveyssi |
| 7,375,929 B1 | 5/2008 | Chang et al. |
| 7,379,266 B1 | 5/2008 | Ou-Yang et al. |
| 7,381,904 B1 | 6/2008 | Codilian |
| 7,385,784 B1 | 6/2008 | Berding et al. |
| 7,388,731 B1 | 6/2008 | Little et al. |
| 7,420,771 B1 | 9/2008 | Hanke et al. |
| 7,434,987 B1 | 10/2008 | Gustafson et al. |
| 7,436,625 B1 | 10/2008 | Chiou et al. |
| 7,440,234 B1 | 10/2008 | Cheng et al. |
| 7,477,488 B1 | 1/2009 | Zhang et al. |
| 7,477,489 B1 | 1/2009 | Chen et al. |
| 7,484,291 B1 | 2/2009 | Ostrander et al. |
| 7,505,231 B1 | 3/2009 | Golgolab et al. |
| 7,529,064 B1 | 5/2009 | Huang et al. |
| 7,538,981 B1 | 5/2009 | Pan |
| 7,561,374 B1 | 7/2009 | Codilian et al. |
| 7,567,410 B1 | 7/2009 | Zhang et al. |
| 7,576,955 B1 | 8/2009 | Yang et al. |
| 7,593,181 B1 | 9/2009 | Tsay et al. |
| 7,605,999 B1 | 10/2009 | Kung et al. |
| 7,609,486 B1 | 10/2009 | Little |
| 7,610,672 B1 | 11/2009 | Liebman |
| 7,633,721 B1 | 12/2009 | Little et al. |
| 7,633,722 B1 | 12/2009 | Larson et al. |
| 7,656,609 B1 | 2/2010 | Berding et al. |
| 7,660,075 B1 | 2/2010 | Lin et al. |
| 7,672,083 B1 | 3/2010 | Yu et al. |
| 7,684,155 B1 | 3/2010 | Huang et al. |
| 7,686,555 B1 | 3/2010 | Larson et al. |
| 7,709,078 B1 | 5/2010 | Sevier et al. |
| 7,715,149 B1 | 5/2010 | Liebman et al. |
| 7,729,091 B1 | 6/2010 | Huang et al. |
| 7,751,145 B1 | 7/2010 | Lin et al. |
| 7,826,177 B1 | 11/2010 | Zhang et al. |
| 7,852,601 B1 | 12/2010 | Little |
| 7,864,488 B1 | 1/2011 | Pan |
| 7,898,770 B1 | 3/2011 | Zhang et al. |
| 7,903,369 B1 | 3/2011 | Codilian et al. |
| 7,907,369 B1 | 3/2011 | Pan |
| 7,911,742 B1 | 3/2011 | Chang et al. |
| 7,926,167 B1 | 4/2011 | Liebman et al. |
| 7,957,095 B1 | 6/2011 | Tsay et al. |
| 7,957,102 B1 | 6/2011 | Watson et al. |
| 7,961,436 B1 | 6/2011 | Huang et al. |
| 8,004,782 B1 | 8/2011 | Nojaba et al. |
| 8,009,384 B1 | 8/2011 | Little |
| 8,018,687 B1 | 9/2011 | Little et al. |
| 8,031,431 B1 | 10/2011 | Berding et al. |
| 8,064,168 B1 | 11/2011 | Zhang et al. |
| 8,064,170 B1 | 11/2011 | Pan |
| 8,068,314 B1 | 11/2011 | Pan et al. |
| 8,081,401 B1 | 12/2011 | Huang et al. |
| 8,100,017 B1 | 1/2012 | Blick et al. |
| 8,116,038 B1 | 2/2012 | Zhang et al. |
| 8,125,740 B1 | 2/2012 | Yang et al. |
| 8,142,671 B1 | 3/2012 | Pan |
| 8,156,633 B1 | 4/2012 | Foisy |
| 8,159,785 B1 | 4/2012 | Lee et al. |
| 8,189,298 B1 | 5/2012 | Lee et al. |
| 8,194,348 B2 | 6/2012 | Jacoby et al. |
| 8,194,354 B1 | 6/2012 | Zhang et al. |
| 8,194,355 B1 | 6/2012 | Pan et al. |
| 8,203,806 B2 | 6/2012 | Larson et al. |
| 8,223,453 B1 | 7/2012 | Norton et al. |
| 8,228,631 B1 | 7/2012 | Tsay et al. |
| 8,233,239 B1 | 7/2012 | Teo et al. |
| 8,248,733 B1 | 8/2012 | Radavicius et al. |
| 8,259,417 B1 | 9/2012 | Ho et al. |
| 8,274,760 B1 | 9/2012 | Zhang et al. |
| 8,276,256 B1 | 10/2012 | Zhang et al. |
| 8,279,560 B1 | 10/2012 | Pan |
| 8,284,514 B1 | 10/2012 | Garbarino |
| 8,289,646 B1 | 10/2012 | Heo et al. |
| 8,300,352 B1 | 10/2012 | Larson et al. |
| 8,305,708 B2 | 11/2012 | Tacklind |
| 8,320,086 B1 | 11/2012 | Moradnouri et al. |
| 8,322,021 B1 | 12/2012 | Berding et al. |
| 8,345,387 B1 | 1/2013 | Nguyen |
| 8,363,351 B1 | 1/2013 | Little |
| 8,369,044 B2 | 2/2013 | Howie et al. |
| 8,411,389 B1 | 4/2013 | Tian et al. |
| 8,416,522 B1 | 4/2013 | Schott et al. |
| 8,416,534 B1 | 4/2013 | Heo et al. |
| 8,422,171 B1 | 4/2013 | Guerini |
| 8,422,175 B1 | 4/2013 | Oveyssi |
| 8,432,641 B1 | 4/2013 | Nguyen |
| 8,437,101 B1 | 5/2013 | German et al. |
| 8,438,721 B1 | 5/2013 | Sill |
| 8,446,688 B1 | 5/2013 | Quines et al. |
| 8,451,559 B1 | 5/2013 | Berding et al. |
| 8,467,153 B1 | 6/2013 | Pan et al. |
| 8,472,131 B1 | 6/2013 | Ou-Yang et al. |
| 8,477,460 B1 | 7/2013 | Liebman |
| 8,488,270 B2 | 7/2013 | Brause et al. |
| 8,488,280 B1 * | 7/2013 | Myers et al. ............... 360/256.2 |
| 8,499,652 B1 | 8/2013 | Tran et al. |
| 8,514,514 B1 | 8/2013 | Berding et al. |
| 8,530,032 B1 | 9/2013 | Sevier et al. |
| 8,542,465 B2 | 9/2013 | Liu et al. |
| 8,547,664 B1 | 10/2013 | Foisy et al. |
| 8,553,356 B1 | 10/2013 | Heo et al. |
| 8,553,366 B1 | 10/2013 | Hanke |
| 8,553,367 B1 | 10/2013 | Foisy et al. |
| 8,616,900 B1 | 12/2013 | Lion |
| 8,665,555 B1 | 3/2014 | Young et al. |
| 8,667,667 B1 | 3/2014 | Nguyen et al. |
| 8,693,139 B2 | 4/2014 | Tian et al. |
| 8,693,140 B1 | 4/2014 | Weiher et al. |
| 8,699,179 B1 | 4/2014 | Golgolab et al. |
| 8,702,998 B1 | 4/2014 | Guerini |
| 8,705,201 B2 | 4/2014 | Casey et al. |
| 8,705,209 B2 | 4/2014 | Seymour et al. |
| 8,717,706 B1 | 5/2014 | German et al. |
| 8,743,509 B1 | 6/2014 | Heo et al. |
| 8,755,148 B1 | 6/2014 | Howie et al. |
| 8,756,776 B1 | 6/2014 | Chen et al. |

(56) References Cited

U.S. PATENT DOCUMENTS

| | | |
|---|---|---|
| 8,760,800 B1 | 6/2014 | Brown et al. |
| 8,760,814 B1 | 6/2014 | Pan et al. |
| 8,760,816 B1 | 6/2014 | Myers et al. |
| 8,773,812 B1 | 7/2014 | Gustafson et al. |
| 8,780,491 B1 | 7/2014 | Perlas et al. |
| 8,780,504 B1 | 7/2014 | Teo et al. |
| 8,792,205 B1 | 7/2014 | Boye-Doe et al. |
| 8,797,677 B2 | 8/2014 | Heo et al. |
| 8,797,689 B1 | 8/2014 | Pan et al. |
| 8,824,095 B1 | 9/2014 | Dougherty |
| 8,824,098 B1 | 9/2014 | Huang et al. |
| 9,099,153 B2 * | 8/2015 | Smyth et al. |
| 2006/0176608 A1 | 8/2006 | Xu et al. |
| 2007/0081269 A1 | 4/2007 | Kim et al. |
| 2011/0212281 A1 | 9/2011 | Jacoby et al. |
| 2013/0038964 A1 | 2/2013 | Garbarino et al. |
| 2013/0091698 A1 | 4/2013 | Banshak, Jr. et al. |
| 2013/0155546 A1 | 6/2013 | Heo et al. |
| 2013/0290988 A1 | 10/2013 | Watson et al. |

OTHER PUBLICATIONS

Notice of Allowance dated Nov. 26, 2014 from U.S. Appl. No. 13/897,655, 8 pages.

Office Action dated Jul. 23, 2014 from U.S. Appl. No. 13/897,655, 6 pages.

* cited by examiner

STORAGE DEVICE WITH A COVER SUPPORTING PORTION

CROSS-REFERENCE TO RELATED APPLICATION

This application is a divisional of U.S. patent application Ser. No. 13/897,655, filed on May 20, 2013, which claims the benefit of U.S. provisional application No. 61/808,156, filed Apr. 3, 2013, the disclosure of which is hereby incorporated by reference.

FIELD

The present disclosure relates generally to information storage devices, and in particular, to a latch assembly having a cover support member.

BACKGROUND

Disk drives frequently include a latch, a base, and top cover. The base may be a cast aluminum cavity which (after assembly) holds a majority of the drive's components. The top cover may be a stamped steel plate which mates with the upper portion of the base and encloses all of the drive's internal components. The latch is a magnetically actuated plastic hooking mechanism which pivots about a machined post and is designed to prevent drive failure during a non-operating rotational shock event. However, when an external load is applied to top cover, the top cover may deflect toward the latch and latch may suffer binding. Such binding may prevent the latch from functioning properly. Thus, a structure that may reduce cover deflection may be one aspect of the present application.

BRIEF DESCRIPTION OF THE DRAWINGS

A general architecture that implements the various features of the disclosure will now be described with reference to the drawings. The drawings and the associated descriptions are provided to illustrate implementations of the disclosure and not to limit the scope of the disclosure. Throughout the drawings, reference numbers are reused to indicate correspondence between referenced elements.

DETAILED DESCRIPTION

Figure 1:
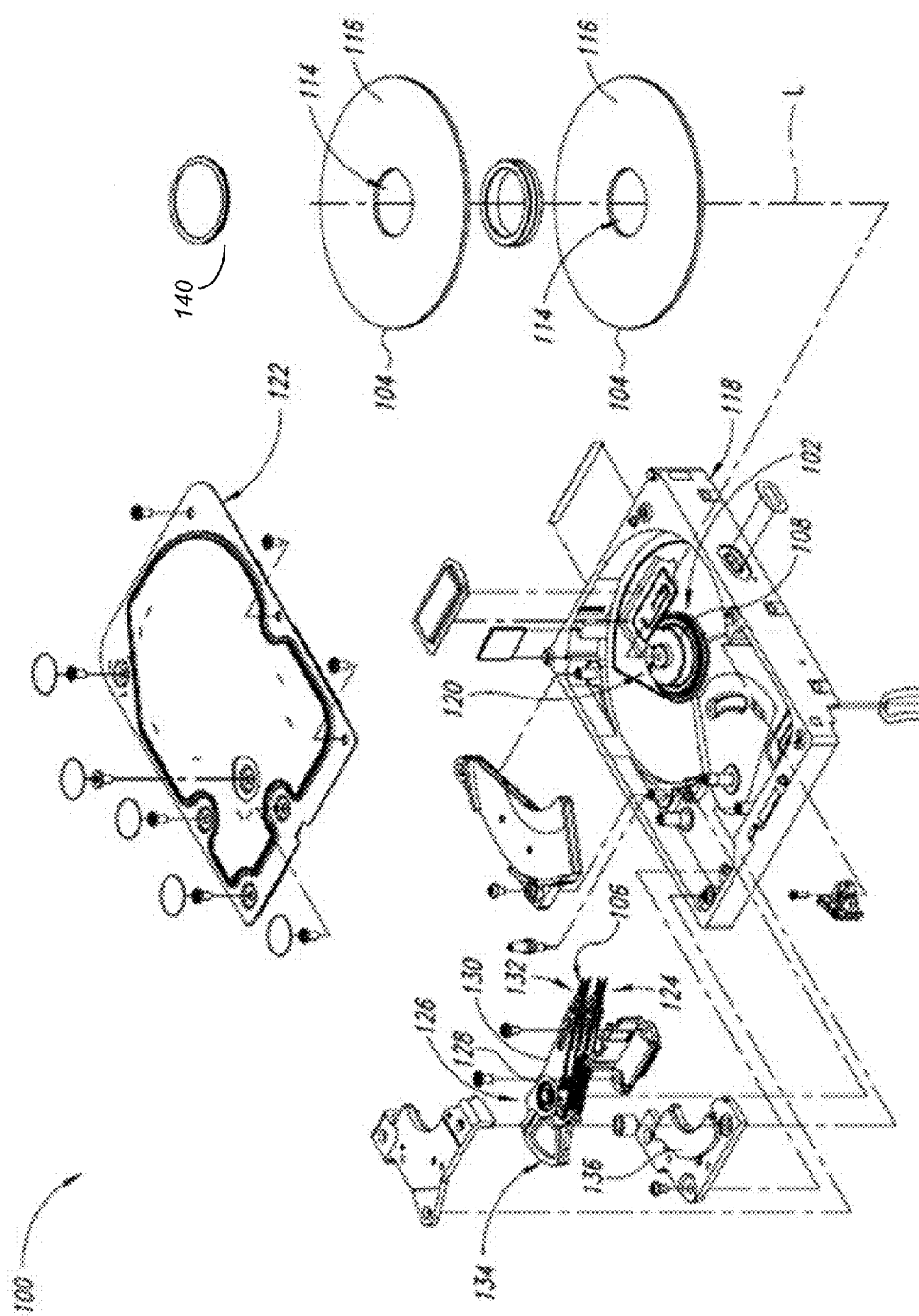
FIG. 1 provides an exploded, perspective view generally illustrating a disk drive.

Referring to FIG. 1, a general disk drive 100 is illustrated. The disk drive 100 comprises a hub 102, a disk 104 physically contacting and supported by at least one mounting surface (not labeled in FIG. 1) of the hub 102, and a head 106 operable to write to and read from the disk 104. The hub 102 may comprises a substantially cylindrical portion 108 which define a longitudinal axis L and a mounting surface substantially normal to the longitudinal axis L, the mounting surface extending radially outward.

As illustrated in FIG. 1, the disk drive 100 comprises a magnetic disk drive, and the structures and methods described herein will be described in terms of such a disk drive. However, these structures and methods may also be applied to and/or implemented in other disk drives, including, e.g., optical and magneto-optical disk drives.

The disks 104 may comprise any of a variety of magnetic or optical disk media having a substantially concentric opening 114 defined there through. Of course, the disk drive 100 may instead include more or fewer disks. For example, the disk drive 100 may include one disk or it may include two or more disks. The disks 104 each include a disk surface 116, as well as an opposing disk surface not visible in FIG. 1. Further, the disk surfaces 116 may comprise a plurality of generally concentric tracks for storing data.

As illustrated, the hub 102 may be coupled to and support the disks 104. The hub 102 may also be rotatably attached to a base 118 of the disk drive 100, and may form one component of a motor 120 (e.g., a spindle motor). The motor 120 and the hub 102 may be configured to rotate the disks 104 about the longitudinal axis L.

Further, a disk clamp 140 may be coupled to the hub 102 to provide a downward clamping force to the disks 104. Specifically, the disk clamp 140 may be positioned above the disks 104 and attached to an upper surface of the hub 102. The interaction of the disk clamp 140 and the hub 102 to provide the downward clamping force is discussed in more detail below.

The disk drive 100 may further include a cover 122, which, together with the base 118, may house the disks 104 and the motor 120. The disk drive 100 may also include a head stack assembly ("HSA") 124 rotatably attached to the base 118. The HSA 124 may include an actuator 126 comprising an actuator body 128 and one or more actuator arms 130 extending from the actuator body 128. The actuator body 128 may further be configured to rotate about an actuator pivot axis.

One or two head gimbal assemblies ("HGA") 132 may be attached to a distal end of each actuator arm 130. Each HGA 132 includes a head 106 operable to write to and read from a corresponding disk 104. The HSA 124 may further include a coil 134 through which a changing electrical current is passed during operation. The coil 134 interacts with one or more magnets 136 that are attached to the base 118 to form a voice coil motor ("VCM") for controllably rotating the HSA 124.

The head 106 may comprise any of a variety of heads for writing to and reading from a disk 104. In magnetic recording applications, the head 106 may include an air bearing slider and a magnetic transducer that includes a writer and a read element. The magnetic transducer's writer may be of a longitudinal or perpendicular design, and the read element of the magnetic transducer may be inductive or magneto resistive. In optical and magneto-optical recording applications, the head may include a mirror and an objective lens for focusing laser light on to an adjacent disk surface.

The disk drive 100 may further include a printed circuit board ("PCB") (not shown). The PCB may include, inter alia, a disk drive controller for controlling read and write operations and a servo control system for generating servo control signals to position the actuator arms 130 relative to the disks 104.

Some disk drives may also include a latch assembly (not shown in FIG. 1) provided within the base 118 and located in the vicinity of the actuator arm 126 of the HSA 124. Several implementations of a latch assembly 150, 650 including a latch mechanism 142, 642 movable about a latch post 144, 644 are shown in FIGS. 2A-7 below.

Figure 2B:
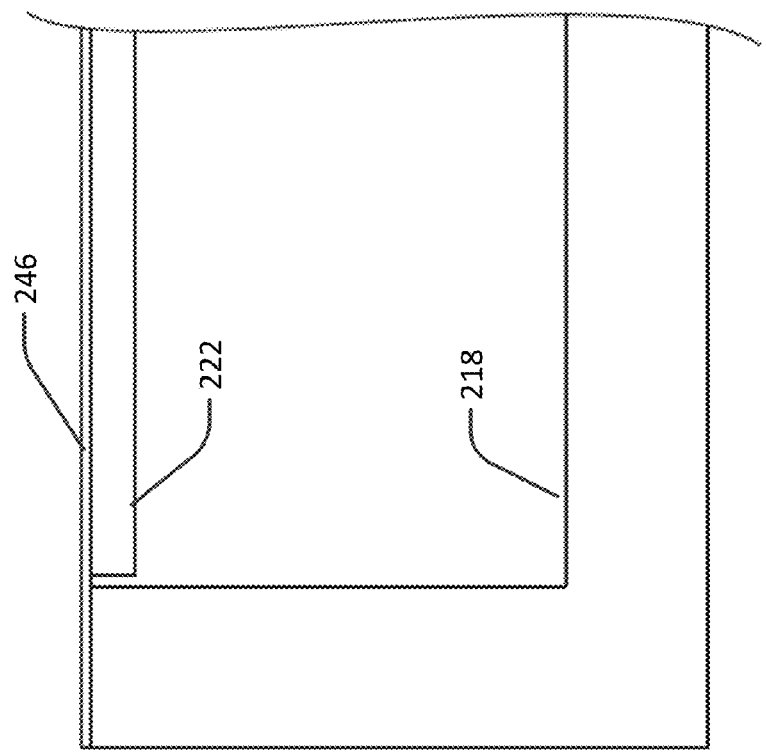
FIGS. 2A and 2B provide sectional views of two embodiments of disk drive housings that could be used with implementations of the present application.
Figure 2A:
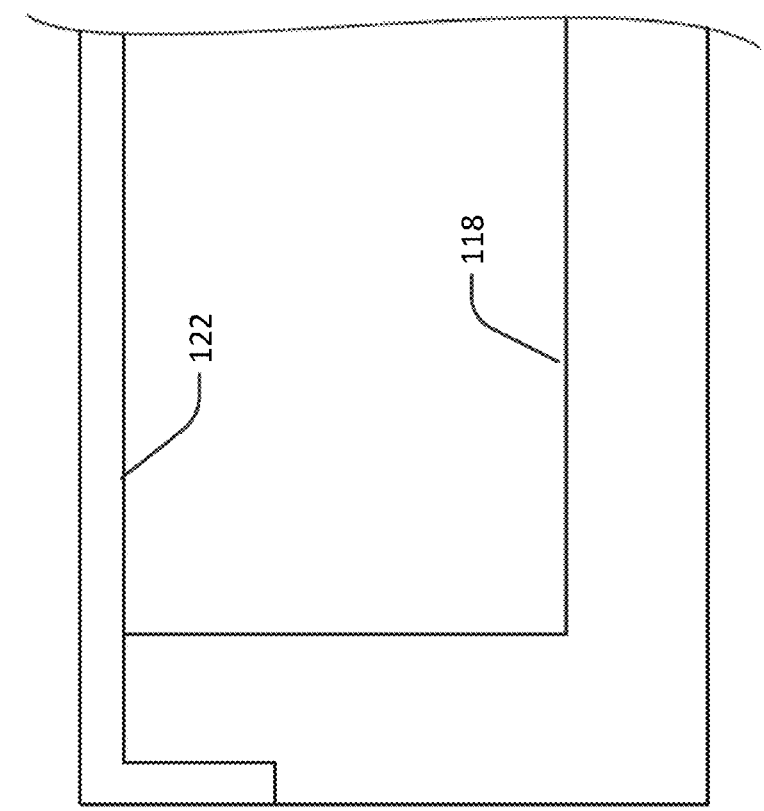

FIG. 2A illustrates a first embodiment of a disk drive assembly that could be used with an implementation of the present application. In this first embodiment, the base 118 is configured to be open at the top so that components can be positioned within the base 118. Further, the cover 122 is configured to wrap around the sides of the base 118 to create an effective seal. Additionally, by wrapping around the sides of the base 118, some pinch resistance may be provided. The base 118 and the cover 122 may be machined from metallic materials in some embodiments. However, the base 118 and cover 122 are not limited to this and may be formed from any materials apparent to a person ordinary skill in the art using any manufacturing process.

FIG. 2B illustrates a second embodiment of a disk drive assembly that could be used with an implementation of the present application. In this second embodiment, the top cover 222 is recessed below the top surface of the base 218, and the entire drive may be covered by a sealing member 246 (e.g. thin-film seal, for example). In some implementations, a sealing member 246 may also be provided to create a hermetic seal within the drive. This sealing member 246 is not particularly limited, and may include a thin-film having adhesive applied to one side such that the sealing member 246 conforms to features of the cover 222, and the base 218. This design may allow for more efficient use of the available Z-height. However, this design may suffer reduced cover support along the edges of the drive (particularly in the area directly above the latch assembly 150).

Figure 3:
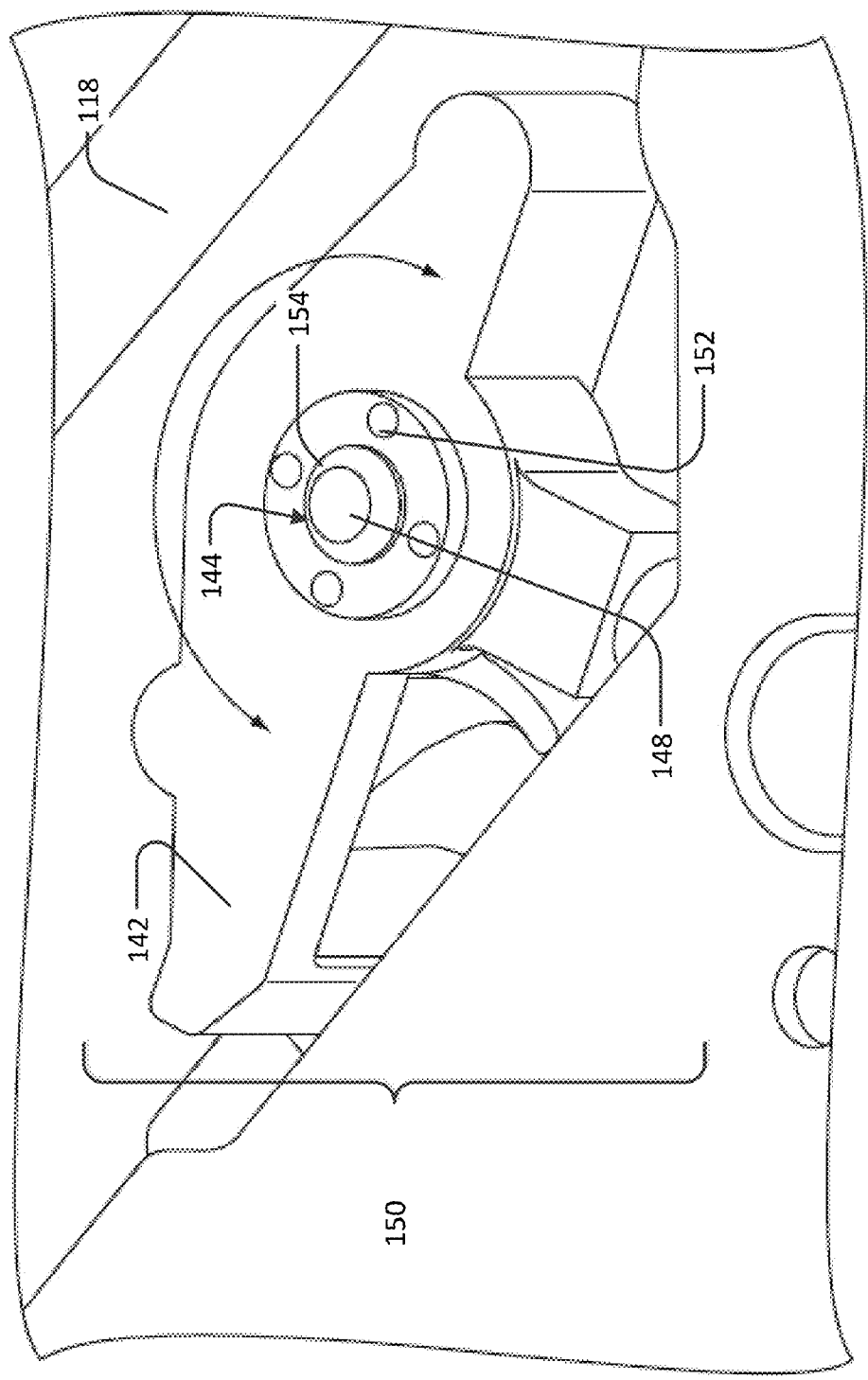
FIG. 3 provides a perspective view of a disk drive including a latch assembly according to a first implementation of the present application.
Figure 4:
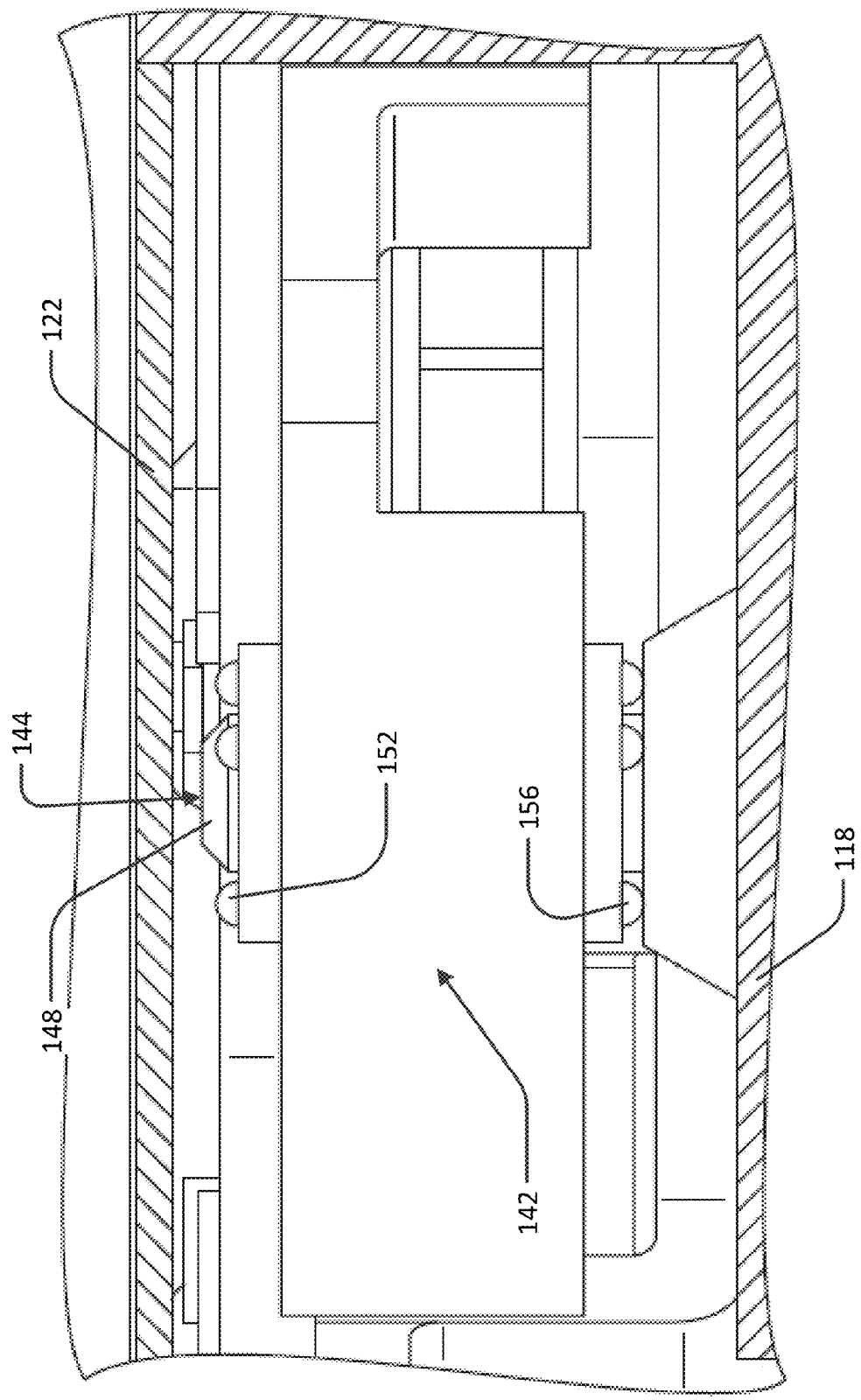
FIG. 4 provides a sectional view of a disk drive including a latch assembly according to a first implementation of the present application.
Figure 5:
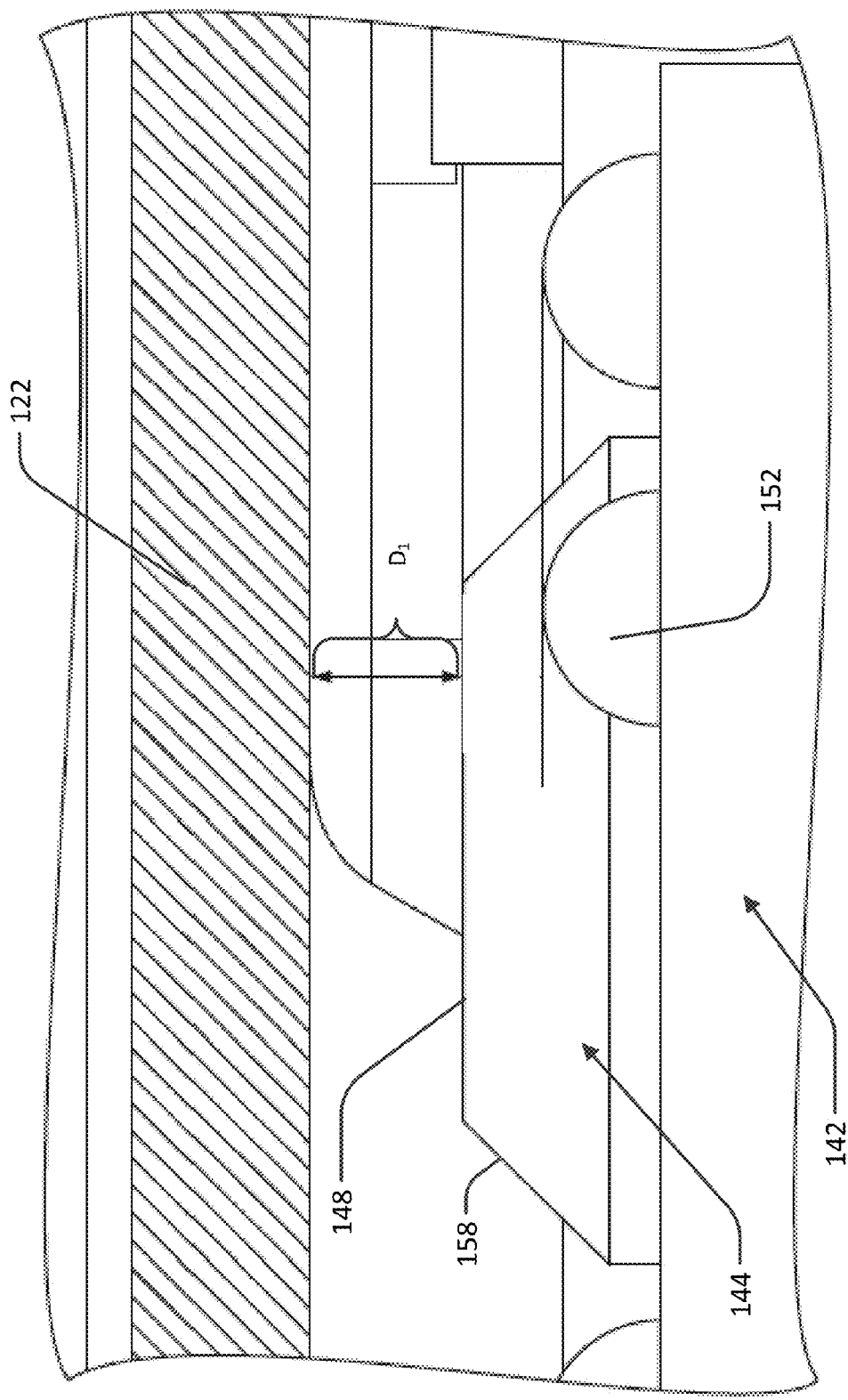
FIG. 5 provides an enlarged view of portion of the sectional view of a disk drive of FIG. 4.

FIG. 3 illustrates a perspective view of a disk drive including a latch assembly 150 according to a first implementation of the present application. Additionally, FIG. 4 illustrates a sectional view of a disk drive including the latch assembly 150 according to a first implementation of the present application. Further, FIG. 5 illustrates an enlarged view of portion of the sectional view of a disk drive of FIG. 4.

As illustrated, the latch assembly 150 comprises a latch mechanism 142, and a latch post 144. The latch mechanism 142 is formed with a through-hole 154 passing from the bottom of the latch mechanism 142 through to the top of the latch mechanism 142. The latch post 144 may be inserted through the through-hole 154. The diameters of the latch post 144 and the latch mechanism 142 are sized such that the latch mechanism 142 can freely rotate around the latch post 144. Further, the latch mechanism 142 may be configured to move vertically along the length of the latch post 144 such that the latch mechanism 142 "floats" between the base 118 and the cover 122 during operation of the disk drive.

In some implementations, the latch mechanism 142 may also include one or more cover contacting portions 152 disposed on the upper surface of the latch mechanism 142. The one or more cover contacting portions 152 may provide a reduced contact area to reduce friction between the latch mechanism 142 and the cover 122 if the latch mechanism 142 contacts the cover 122. In the implementation shown in FIGS. 3-5, the one or more cover contacting portions 152 are formed as hemi-spherical protrusions extending upward from the upper surface of the latch mechanism 142. Additionally, in the implementation of FIGS. 3-5, four cover contacting portions 152 are provided evenly spaced around the through hole 154. However, the cover contacting portions 152 are not limited to this configuration and may have any shape or arrangement as would be apparent to a person of ordinary skill in the art.

Additionally, in some implementations, the latch mechanism 142 may also include one or more base contacting portions 156 (shown in FIG. 4) disposed on the bottom surface of the latch mechanism 142. The one or more base contacting portions 156 may provide a reduced contact area to reduce friction between the latch mechanism 142 and the base 118 if the latch mechanism contacts the base 118. In the implementation shown in FIG. 4, the one or more base contacting portions 156 are formed as hemi-spherical protrusions extending downward from the bottom surface of the latch mechanism 142. However, the base contacting portions 156 are not limited to this configuration and may have any shape or arrangement as would be apparent to a person of ordinary skill in the art.

As illustrated in FIG. 4, the latch post 144 has a substantially cylindrical shape and extends upward from the base 118 toward the cover 122. Further, a cover supporting portion 148 is provided at one end of the substantially cylindrical shape. In one embodiment, the latch post 144 is configured to have a length such that when a deflecting force is applied to the cover 122, the cover 122 contacts and is supported by the cover supporting portion 148 without compressing the latch mechanism 142 such that the latch mechanism 142 contacts both the cover 122 and the base 118 simultaneously. In other words, the length of the latch post 144 provides a clearance for the latch mechanism 142 so that the latch mechanism 142 does not become trapped between the cover 122 and the base 118 when an external load is applied to the drive. By using the latch post 144 as a cover limiter may ensure continued functionality of the latch mechanism 142 during worst case loading conditions.

In some implementations, a gap $D_1$ (shown in FIG. 5) is provided between the cover supporting portion 148 and the cover 122 such that the cover 122 and cover supporting portion 148 of the latch post 144 only contact when a load is applied to the cover 122. However, in some implementations, no gap may be formed between the cover 122 and the cover supporting portion 148 such that the cover 122 and the cover supporting portion 148 are contacting.

As illustrated in FIGS. 3-5, the cover supporting portion 148 is formed with a substantially flat surface with a tapered region 158 such that the diameter of the latch post 144 decreases toward the cover. However, the cover supporting portion 148 is not limited to this configuration and may have other alternative configurations. For example, the cover supporting portion 148 may be formed as a hemi-spherical portion having a curved upper surface. Further, in some implementations, the latch post 144 may be formed with constant diameter along its length.

The latch post 144 may be formed from a variety of materials including machined aluminum or steel. Additionally, in some implementations, the latch post 144 is formed as a piece separate from the base 118 that is inserted through the base 118. However, the latch post 144 is not limited to being a separate piece inserted through the base 118. The latch post 144 may be formed as a separate pieced attached to the bottom of the base 118 by adhesive, welding, screw attachment, press fitting, or any other type of attachment that might be apparent to a person of ordinary skill in the art. The latch post 144 may also be formed as a machined extension feature formed as a part of the base 118 or any other configuration as would be apparent to a person of ordinary skill in the art.

Figure 6:
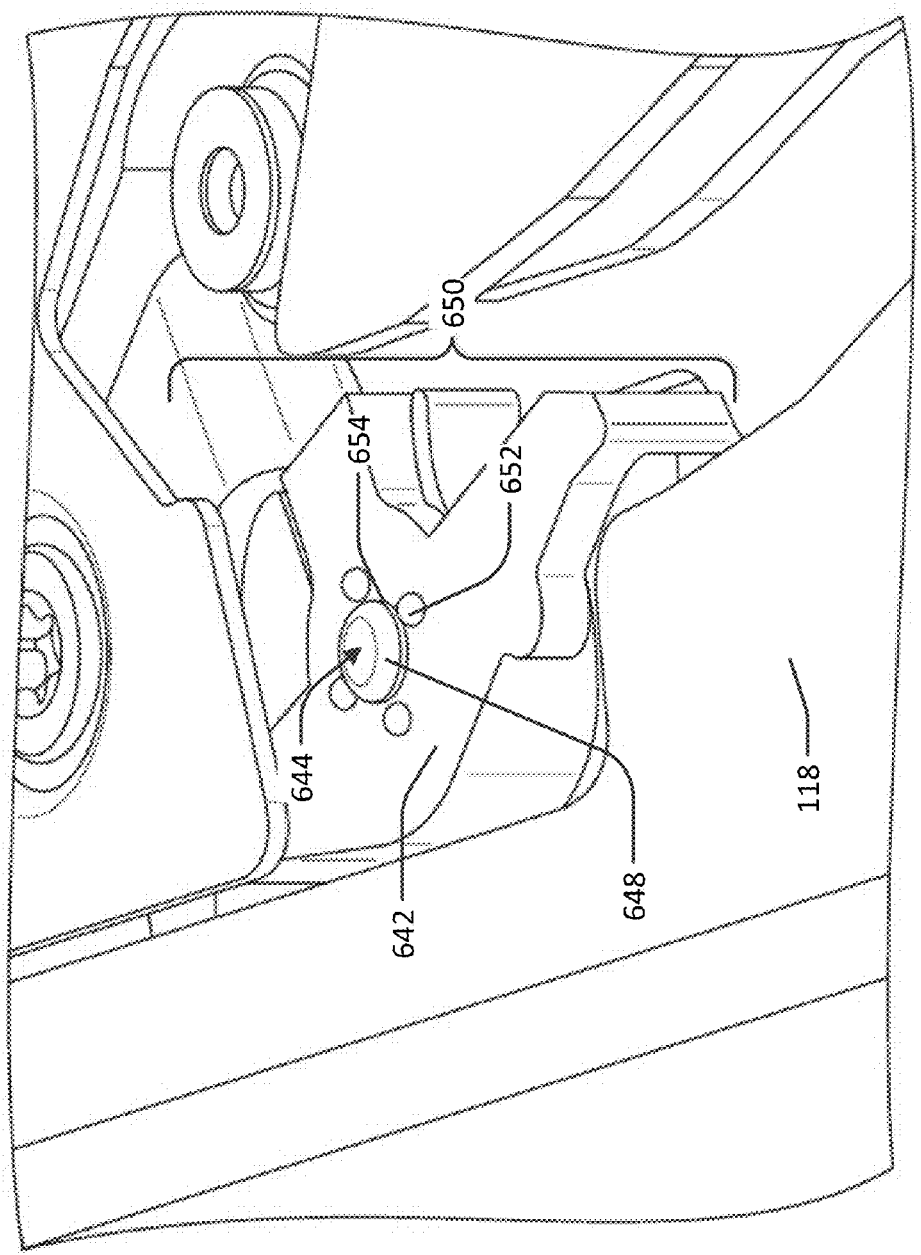
FIG. 6 provides a perspective view of a disk drive including a latch assembly according to a second implementation of the present application.
Figure 7:
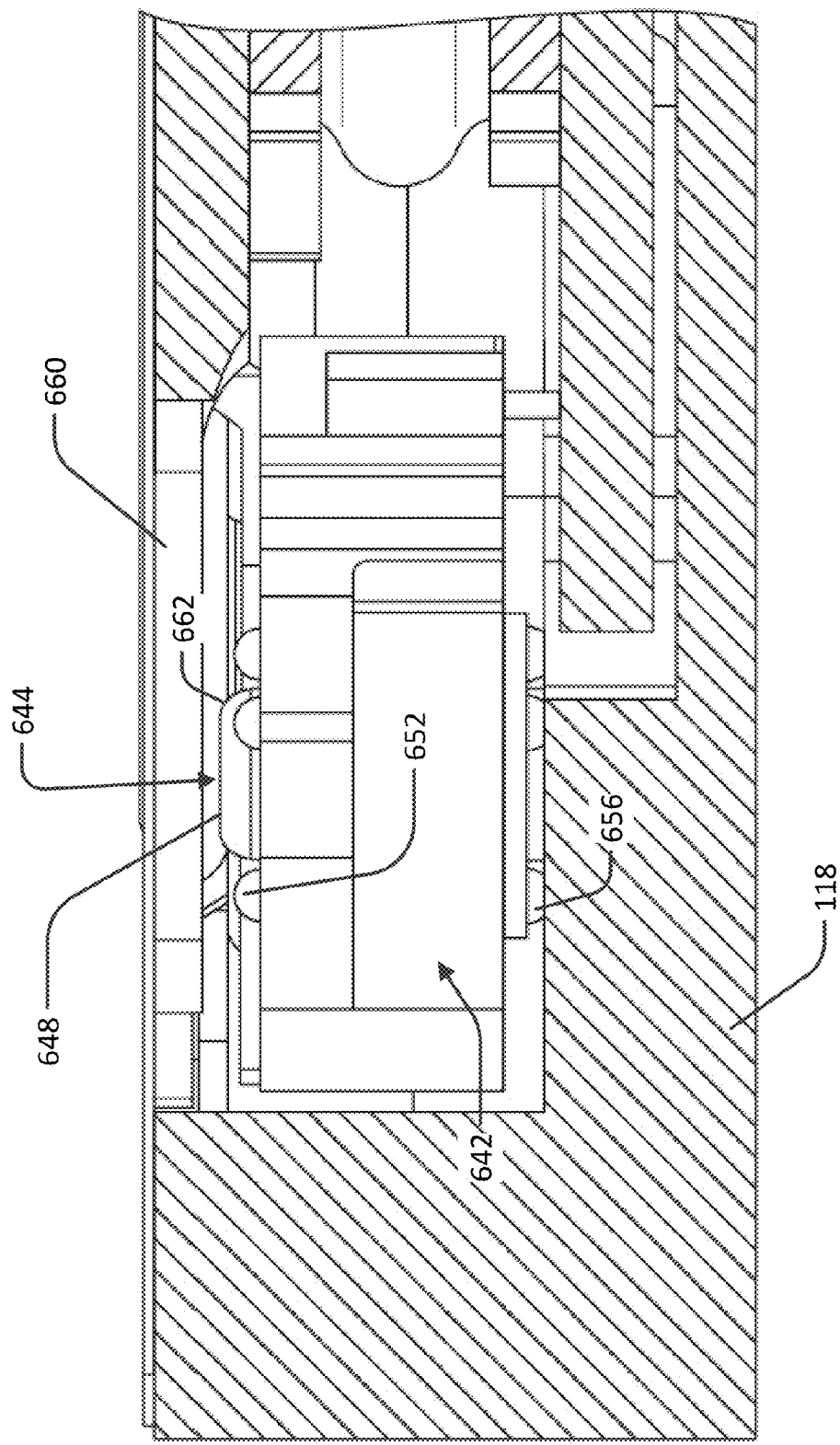
FIG. 7 provides a sectional view of a disk drive including a latch assembly according to a second implementation of the present application.

In the implementation illustrated in FIGS. 3-5, the latch post 144 is configured to support the cover of the disk drive assembly. However, implementations of the present application are not limited to this configuration. The latch post 144 may be configured to support other components of the disk drive assembly during external loading conditions to prevent binding or compressing of the latch mechanism 142. FIG. 6 provides a perspective view of a disk drive a latch assembly according to a second implementation where the latch post 644 is configured to support the VCM cover 660. FIG. 7 provides a sectional view of the disk drive of FIG. 6.

Similar to the implementations discussed above, the latch assembly 650 in this implementation comprises a latch mechanism 642, and a latch post 644. The latch mechanism 642 is formed with a through-hole 654 passing from the bottom of the latch mechanism 642 through to the top of the latch mechanism 642. The latch post 644 may be inserted through the through-hole 654. The diameters of the latch post 644 and the latch mechanism 642 may be sized such that the latch mechanism 642 can freely rotate around the latch post 644. Further, the latch mechanism 642 may be configured to move vertically along the length of the latch post 644 such that the latch mechanism 642 "floats" between the base 118 and the VCM cover 660 during operation of the disk drive.

In some implementations, the latch mechanism 642 may also include one or more VCM cover contacting portions 652 disposed on the upper surface of the latch mechanism 642. The one or more cover contacting portions 652 may provide a reduced contact area to reduce friction between the latch mechanism 642 and the VCM cover 660 if the latch mechanism 642 contacts the VCM cover 660. The one or more cover contacting portions 652 may be formed as hemi-spherical protrusions extending upward from the upper surface of the latch mechanism 642. Additionally, two or more VCM cover contacting portions 652 may be evenly spaced around the through-hole 654. However, the VCM cover contacting portions 652 are not limited to this configuration and may have any shape or arrangement as would be apparent to a person of ordinary skill in the art.

Additionally, in some implementations, the latch mechanism 642 may also include one or more base contacting portions 656 disposed on the bottom surface of the latch mechanism 642. The one or more base contacting portions 656 may provide a reduced contact area to reduce friction between the latch mechanism 642 and the base 118 if the latch mechanism 642 contacts the base 118. The one or more base contacting portions 656 are formed as hemi-spherical protrusions extending downward from the bottom surface of the latch mechanism 642. However, the base contacting portions 656 are not limited to this configuration and may have any shape or arrangement as would be apparent to a person of ordinary skill in the art.

As illustrated in the latch post 644 has a substantially cylindrical shape and extends upward from the base 118 toward the VCM cover 660. Further, a cover supporting portion 648 is provided at one end of the substantially cylindrical shape. The latch post 644 is configured to have a length such that when a deflecting force is applied to the VCM cover 660, the VCM cover 660 contacts and is supported by the cover supporting portion 648 without compressing the latch mechanism 642 such that the latch mechanism 642 contacts both the VCM cover 622 and the base 118 simultaneously. In other words, the length of the latch post 644 provides a clearance for the latch mechanism 642 so that the latch mechanism 642 does not become trapped between the VCM cover 660 and the base 118. By using the latch post 644 as a cover limiter may ensure continued functionality of the latch mechanism 642 during worst case loading conditions.

In some implementations, a gap may be provided between the cover supporting portion 648 and the VCM cover 660 such that the VCM cover 660 and cover supporting portion 648 of the latch post 644 only contacts when a load is applied to the VCM cover 660. However, in some implementations, no gap may be formed between the VCM cover 660 and the cover supporting portion 648 such that the VCM cover 660 and the cover supporting portion 648 are contacting.

As illustrated, the VCM cover supporting portion 648 is formed with a substantially flat surface with a curved region 662 such that the diameter of the latch post 644 gradually decreases toward the VCM cover 660. However, the cover supporting portion 648 is not limited to this configuration and may have other alternative configurations. For example, the cover supporting portion 648 may be formed as a hemi-spherical portion having a curved upper surface. Further, in some implementations, the latch post 644 may be formed with a constant diameter along its length.

The latch post 644 may be formed from a variety of materials including machined aluminum or steel. Additionally, in some implementations, the latch post 644 is formed as a piece separate from the base 118 that is inserted through the base 118. However, the latch post 644 is not limited to being a separate piece inserted through the base 118. The latch post 644 may be formed as a separate pieced attached to the bottom of the base 118 by adhesive, welding, screw attachment, press fitting, or any other type of attachment that might be apparent to a person of ordinary skill in the art. The latch post 644 may also be formed as a machined extension feature formed as a part of the base 118 or any other configuration as would be apparent to a person of ordinary skill in the art.

While certain implementations and embodiments have been described, these implementations and embodiments have been presented by way of example only, and are not intended to limit the scope of the protection. Indeed, the novel methods and apparatuses described herein may be embodied and implemented in a variety of other forms. Furthermore, various omissions, substitutions and changes in the form of the methods and systems described herein may be made without departing from the spirit of the protection. The accompanying claims and their equivalents are intended to cover such forms or modifications as would fall within the scope and spirit of the protection.

What is claimed is:

1. A disk drive assembly comprising:
a base;
a voice coil motor assembly (VCM) comprising a VCM cover;
a post extending from the base toward the VCM cover; and
a latch movable mounted on the post such that the post extends there through, wherein the post comprises a cover supporting portion configured to:
support the VCM cover, and
prevent the VCM cover from compressing the latch and causing the latch to contact both the VCM cover and the base simultaneously when a load is applied to a portion of the VCM cover above the latch, and
wherein the post is configured to define a gap between the cover supporting portion and the VCM cover such that the VCM cover and the cover supporting portion only contact when an external load is applied.

2. The disk drive assembly of claim 1, wherein post is configured to have a height greater than the height of the latch.

3. The disk drive assembly of claim 1, wherein the latch comprises at least one VCM cover contacting portion configured to extend toward the VCM cover and provide a reduced contact area between the latch and the VCM cover.

4. The disk drive assembly of claim 3, wherein the latch comprises at least one base contacting portion configured to extend toward the base and provide a reduced contact area between the latch and the base.

5. The disk drive assembly of claim 4, wherein at least one of the at least one base contacting portion and the at least one VCM cover contacting portion comprises a hemi-spherical structure formed on a surface of the latch.

6. The disk drive assembly of claim 3, wherein the at least one VCM cover contacting portion comprises a hemi-spherical structure formed on a surface of the latch.

7. The disk drive assembly of claim 1, wherein the VCM cover supporting portion comprises:
a substantially flat surface disposed at an end of the post; and
a tapered sidewall adjacent the substantially flat surface, which increases in radius along at least a portion of a height of the post.

8. The disk drive assembly of claim 1, wherein the VCM cover supporting portion comprises: a curved upper surface disposed at an end of the post.

9. The disk drive assembly of claim 1, wherein the post is formed as a pin inserted through the base.

10. The disk drive assembly of claim 1, wherein the post is formed as machined extension feature of the base.

11. A disk drive assembly comprising:
a base;
a voice coil motor assembly (VCM) comprising a VCM cover;
a post extending from the base toward the VCM cover; and
a latch movable mounted on the post such that the post extends there through, wherein the post comprises a VCM cover supporting portion configured to:
support the VCM cover, and
prevent the VCM cover from compressing the latch and causing the latch to contact both the VCM cover and the base simultaneously when a load is applied to a portion of the VCM cover above the latch; and
wherein the VCM cover supporting portion comprises:
a substantially flat surface disposed at an end of the post; and
a tapered sidewall adjacent the substantially flat surface, which increases in radius along at least a portion of a height of the post.

12. The disk drive assembly of claim 11, wherein post is configured to have a height greater than the height of the latch.

13. The disk drive assembly of claim 11, wherein the latch comprises at least one VCM cover contacting portion configured to extend toward the VCM cover and provide a reduced contact area between the latch and the VCM cover.

14. The disk drive assembly of claim 13, wherein the latch comprises at least one base contacting portion configured to extend toward the base and provide a reduced contact area between the latch and the base.

15. The disk drive assembly of claim 14, wherein at least one of the at least one base contacting portion and the at least one VCM cover contacting portion comprises a hemi-spherical structure formed on a surface of the latch.

16. The disk drive assembly of claim 13, wherein the at least one VCM cover contacting portion comprises a hemi-spherical structure formed on a surface of the latch.

17. The disk drive assembly of claim 11, wherein the post is formed as a pin inserted through the base.

18. The disk drive assembly of claim 11, wherein the post is formed as machined extension feature of the base.

* * * * *